April 21, 1942. O. MADER 2,280,654
CONTROL OF ADJUSTABLE SCREW PROPELLERS
Filed June 14, 1938 4 Sheets-Sheet 1
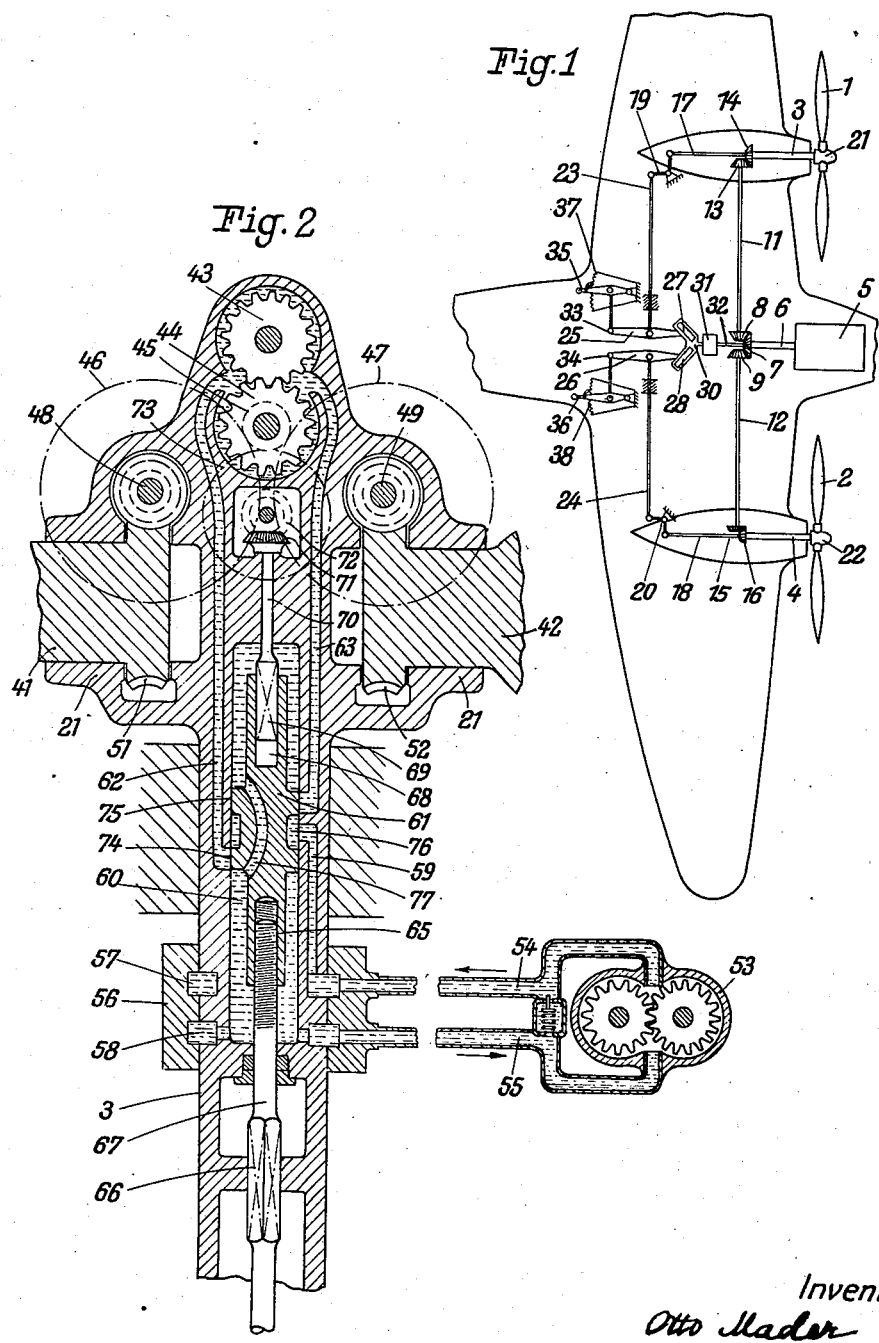
Inventor:
Otto Mader
by Michaelis & Michaelis,
Attys.

April 21, 1942.  O. MADER  2,280,654
CONTROL OF ADJUSTABLE SCREW PROPELLERS
Filed June 14, 1938  4 Sheets-Sheet 2
Fig. 3
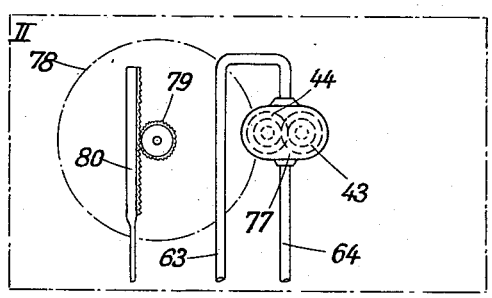
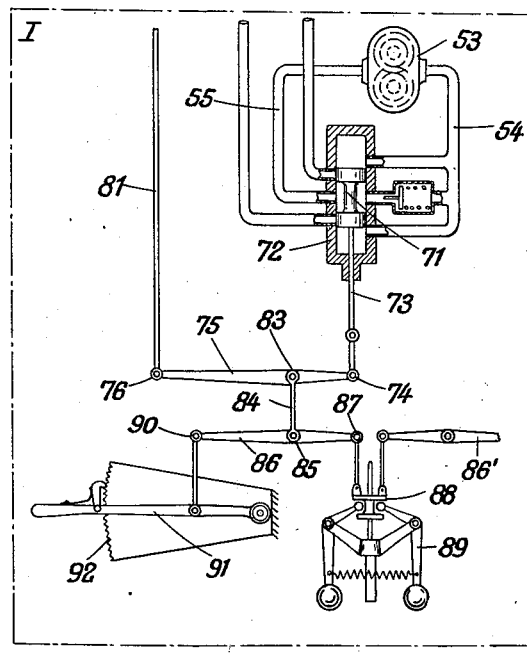
Inventor:
Otto Mader
by Michaelis & Michaelis,
Attys.

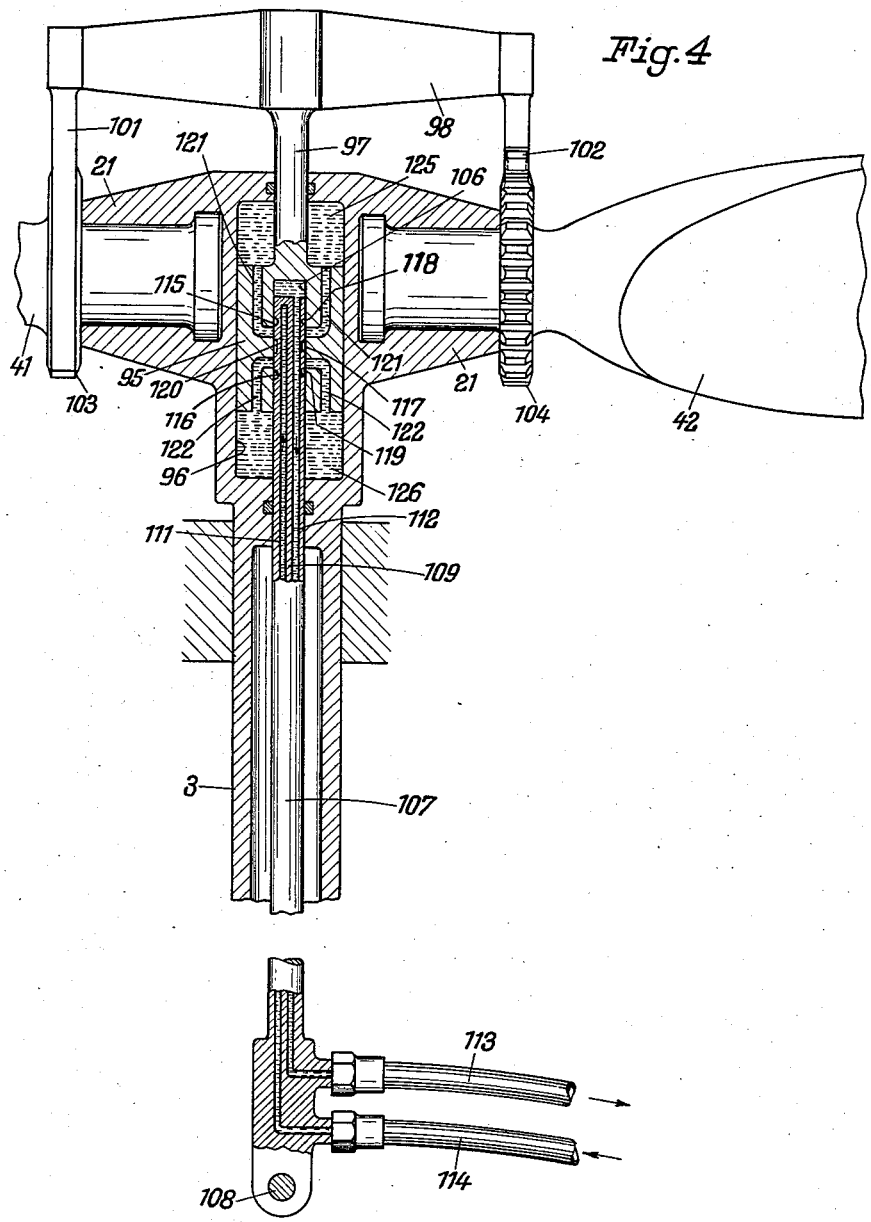

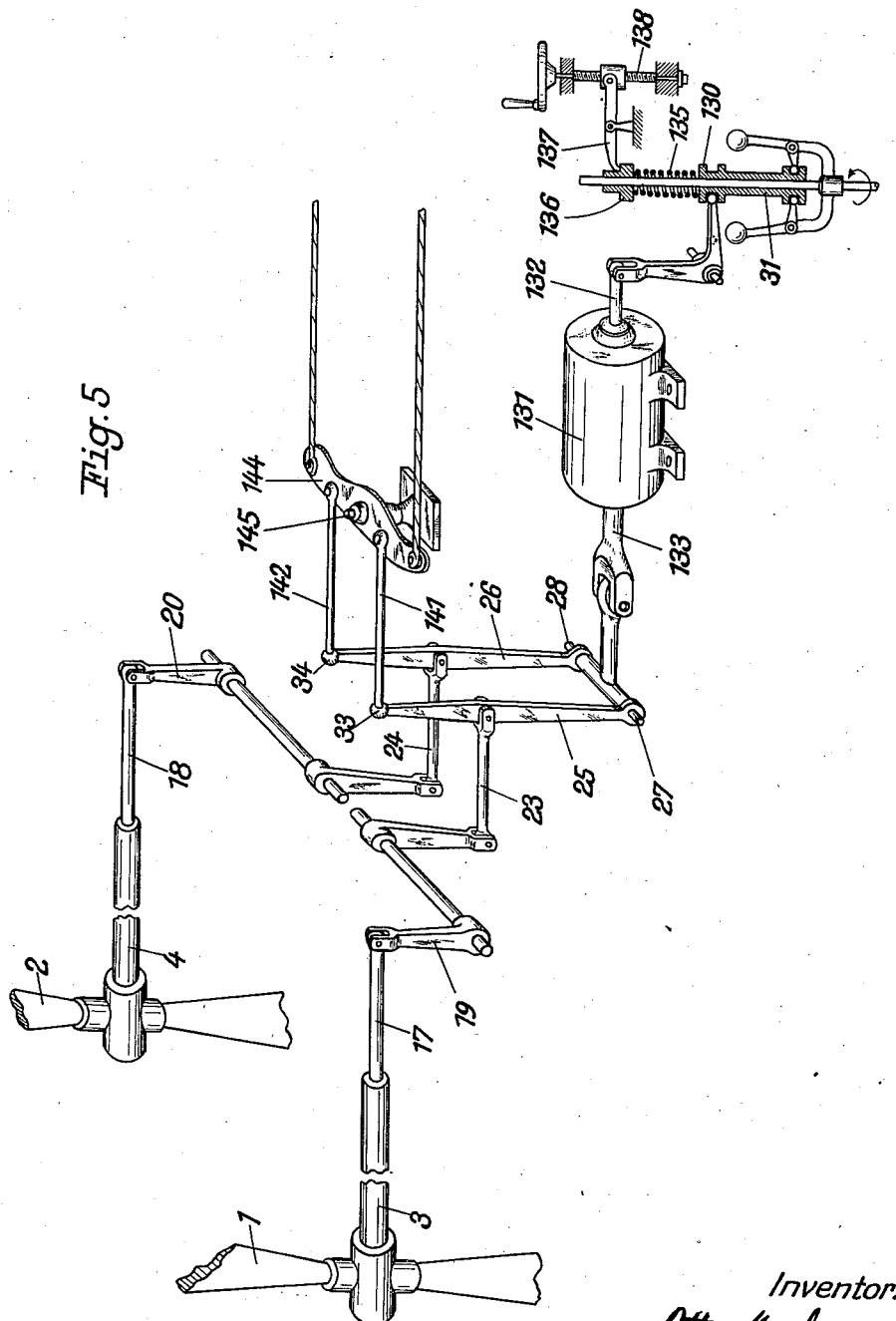

Patented Apr. 21, 1942

2,280,654

UNITED STATES PATENT OFFICE 2,280,654

CONTROL OF ADJUSTABLE SCREW PROPELLERS

Otto Mader, Dessau-Ziebigk, Germany, assignor to Junkers Flugzeug-und-Motorenwerke Aktiengesellschaft, Dessau, Germany Application June 14, 1938, Serial No. 213,586
In Germany June 23, 1937

5 Claims. (Cl. 244—83)

This invention relates to the propulsion of vehicles and more especially aircraft. It has particular reference to means whereby two or more controllable screw propellers, which are positively connected with each other and the blades of which can be constantly adjusted, are driven by a common source of power.

In screw propellers with constantly variable pitch it is known to adjust the blades by means of an automatically acting mechanism in dependence upon some operating value such as for example the speed of the propeller. In screw propellers of this kind a control member responsive to variations of this value is provided to operate the desired adjustment of the blades, if desired, by means of a power switch serving to throw in an auxiliary force. This control member may constitute a centrifugal governor which adjusts the propeller blades so that in the case of variations of the speed or the density of the medium in which the propeller operates, or of the turning moment exerted by the driving engine, the propeller always rotates at substantially constant speed. These devices operate satisfactorily as long as only a single screw propeller is coupled with a driving engine. If however an engine drives a plurality of positively connected propellers and if each propeller is provided with a separate automatically active adjusting device for the blades, a correct functioning of these devices could not be relied upon. In such case one propeller might be adjusted to a higher pitch than required for certain conditions of operation, while the other propeller might be adjusted to a lower pitch. In that case the propellers would rotate at the desired speed, but they would operate under unfavorable conditions and consequently with low efficiency. If such propellers are arranged on both sides of the longitudinal middle plane of the craft, the unequal pitch of the blades further creates an undesirable turning moment about the vertical axis of the craft, which must be compensated by a corresponding adjustment of the control surfaces, and consequently the speed would be further reduced.

According to this invention these drawbacks are avoided by controlling the variation of pitch of the blades of all positively connected propellers from a single control member which responds to variations of an operating value such as the number of revolutions, and by so effecting the transmission of the variations of this member onto the propeller blades to be adjusted that the blades of each propeller are adjusted through an exactly predetermined angle.

To this end a system of adjusting rods acting on the blades of each propeller may lead to an adjusting device common to all the propellers. This adjusting device preferably consists of a control member, responsive to variations of an operating value, and of a power switch influenced by this control member to throw in an auxiliary force serving to operate the blade adjustment.

Since such power transmissions inserted between the blades of the individual propellers and the adjusting device common to all are required to transmit considerable forces over long distances, they are comparatively heavy and the accuracy of transmission of movements might be impaired by the unavoidable considerable changes of form by lost motion and the like. Such drawbacks of long power transmission can be avoided if the source of power is arranged on each screw propeller supplying the adjusting power, so that the power transmission members are required to act only over short distances, being thus comparatively light in weight and being neither hampered by lost motion nor by considerable changes of form. This arrangement however requires these power sources to be controlled in such manner that in each of the connected propellers an exactly predetermined pitch is provided. To accomplish this each of the sources of power must be provided with a control member (power switch) which is adjusted by the common adjusting device and acts in such manner that each adjustment of this control member is correlated a predetermined pitch. Therefor the control is organized either as a return or a following control. In a return control the adjusting device displaces the control member of a power switch, so that a driving medium flows towards the source of power and there effects the adjustment of a power member. This adjusting movement is transmitted onto the power switch member so that this member is returned into its initial position. Thus the greater the displacement of the power switch member, the longer will be the distance through which the power member is adjusted and which is required in order to return this member into its initial position. Therefore the magnitude of the adjustment of the power switch member and the adjustment of the propeller blades effected by the power member always depend upon each other in a predetermined manner.

In a following control the supply of driving medium to the source of power is responsive to a control member adjustable in the direction of displacement of the power member in such manner that the power member directly follows each adjustment of the control member, so that the adjustment of the control member and the adjustment of the power member which results therefrom, are equal. Following control systems are also known, in which one member, for example the control member, is arranged for displacement, the other member, for example the power member, for rocking movement and in which to a predetermined displacing movement of one member corresponds a predetermined rocking angle of the other member.

Besides the common automatically active control member there may also be provided an additional adjustment, either common to all or affecting only each control member individually.

Such an arrangement may serve for changing the blades of the propellers driven by an engine, in the case of failure or intentional stoppage of the engine, into the so-called full feathering position, in which the blades, while at rest, offer the least resistance to propulsion. The arrangement also may be used during the landing of an aircraft or during, manoeuvering of a sea plane, for adjusting the propeller blades to negative pitch, in order to thus brake the flight of the aircraft or, in the sea plane, to enable it to move backward.

In a craft provided with a plurality of screw propellers arranged on either side of the longitudinal middle vertical plane through the aircraft the additional adjustment of pitch may also be made so that in turning the craft the pitch of the blades of the different screw propellers is adjusted to different angles with the outer propellers in the turn adjusted to a greater pitch than the inner propellers. An adjusting device acting in this manner may be coupled with the control surfaces (rudders) controlling the lateral movements of the craft, so that the effect of the rudder adjustment is automatically assisted by an oppositely active change in the pitch of the blades of the screw propellers.

In the drawings affixed to this specification and forming part thereof several embodiments of this invention are illustrated diagrammatically by way of example.

In the drawings

Fig. 1 is a diagrammatic plan view of the means for propelling a flying machine with two screw propellers driven by an engine and arranged on opposite sides of the longitudinal middle vertical plane through the machine.

Fig. 2 is an axial cross-sectional view of the blade adjusting device of a screw propeller, in which the return control source of power (hydraulic motor) and the power switch are bodily connected with the propeller.

Fig. 3 is a diagrammatical view of a modified form of the invention using a return control source of power in which the power switch is mounted at a fixed point outside of the screw propeller.

Fig. 4 is a longitudinal cross-sectional view of a blade adjusting device controlled by hydraulic power transmission means, in which the power member and the power switch coact as a following control.

Fig. 5 is a perspective view of the adjusting gear for two screw propellers arranged on either side of the middle vertical plane through the craft, the pitch of the blades being adjusted in common and automatically in response to an operating value (number of revolutions) and further adjusted in the opposite sense upon operation of the rudder.

Referring to the drawings and first to Fig. 1, the screw propellers 1 and 2 arranged on opposite sides of the longitudinal middle vertical plane through the craft and mounted on the shafts 3 and 4 are driven in common from the engine 5 by means of the engine shaft 6, cog wheel gear 7, 8, 9, intermediate shafts 11, 12 and cog wheel gears 13, 14 and 15, 16. The pitch of the blades, which are rotatably supported in the hubs 21, 22 can be varied by turning the blades about their longitudinal axes. This adjustment of the blades is effected by displacing the rods 17, 18 which extend into the hollow shafts 3 and 4 and are either connected with the blades by mechanical power transmission members, or control separate sources of power supplying the required adjusting force. The outer ends of the rods 17, 18 are connected by means of angle levers 19, 20 and rods 23, 24 to the pivots of the double-armed levers 25, 26. The ends 27, 28 of these levers project into slots of a displaceable gate 30 which is connected to, and adjusted by, an automatically active control member 31, for example a centrifugal governor, which is connected by a shaft 32 with the engine shaft 6 and, whenever the number of rotations of the engine varies, shifts the gate 30 in one or the other direction. The opposite ends 33, 34 of the levers 25, 26 are connected to adjusting levers 35, 36, which can be manually operated and fixed in position by means of pawl and ratchets 37, 38. If the levers 35, 36 are assumed to be held in their neutral position, the pitch of the blades of both screw propellers 1 and 2 is determined by the position of the element 30, and upon the displacement of this element the pitch of the blades of both propellers is changed to the same extent. By displacing the levers 35, 36 the pitch of the blades may be changed either for each propeller individually or for both propellers simultaneously and in the same or in opposite sense, so that the separate propellers can be particularly adapted to the conditions of operation prevailing at each individual moment.

In the device illustrated in Fig. 2 the blades 41, 42 rotatably supported in the propeller hub 21 are adjusted by means of an hydraulic motor having the form of a gear motor with gears 43, 44, which is arranged in the forward end of the hub 21 and driven by means of the spur wheel gears 45, 46 and 45, 47, and the worms 48 and 49 which are in gear with worm wheels 51, 52 forming part of the blades 41 and 42, respectively. The auxiliary motor 43, 44 is supplied with driving fluid by a gear pump 53 which may be driven by the propeller engine 5 (Fig. 1). This pump is connected by a supply pipe 54 and return pipe 55 with the annular grooves 57 and 58, respectively, of a collar 56 which tightly surrounds the propeller shaft 3. From these annular grooves conduits 59, 60 formed in the propeller shaft 3 lead to the power switch in the form of piston valve 61, from which other conduits 62, 63 lead to auxiliary motor 43, 44. The conduit 60 at the same time forms the bore in which the piston valve 61 is located, which is connected on one side by means of screw thread 65 to a rod 67 which is arranged in the hollow propeller shaft 3 for longitudinal movement, being however secured against rotation by a square 66, and which leads to the adjusting device by being joined to one of rods 17, 18, Fig. 1. At the other end, the piston valve 61 is formed with a square boring 68, into which extends the axially movable square extension 69 of a shaft 70 which is connected by means of the cog wheel gear 71, 72 and spur wheel 73 to the spur wheel 45 of the rotary part 44 of the auxiliary motor, so that rotary movement of the shaft 70 is correlated in a predetermined ratio to the rotary movement of the gear 44 of the auxiliary motor. The piston valve 61 contacts the bore 60 with two annular surfaces 74 and 75, the edges of which control the conduits 62 and 63, respectively. The annular space 76 extending between these annular surfaces communicates permanently with the supply conduit 59. In the valve body 61 a conduit 77 bypasses surface 74.

This device operates as follows: If the valve 61 is shifted, by adjusting the rod 67, through a predetermined distance from the middle position shown in the drawings, in which it closes the conduits 62, 63, so that the auxiliary motor 43, 44 is at a standstill, the conduits 62 and 63 are uncovered, the motor 43, 44 is started and adjusts the propeller blades 41, 42, the direction of its movement being predetermined by the direction in which rod 67 is shifted. At the same time the auxiliary motor, by way of the square coupling 68, 69, imparts to the valve body 61 a rotatory movement whereby the body is displaced on the screw thread 65 so as to be displaced longitudinally in a sense opposed to that of its first displacement. During this return movement as soon as the valve body has reached its middle position shown in the drawings and has closed the conduits 62, 63, the auxiliary motor is stopped and the propeller blades are in a different position. The adjustment imparted to the blades is positively correlated to the length of the return movement and therefore also to the length of the displacement imparted to the rod 67, since this latter displacement is equal to the return distance. Thus the position of rod 17 joined to rod 67 also determines the adjustment of the propeller blades 41, 42, and this rod corresponds to one of the rods 17 or 18 shown in Fig. 1.

In the device illustrated in Fig. 3 the broken line I encloses the parts fixed on the craft, and the broken line II the parts connected with the rotating propeller screw. Of these latter parts the means for transmitting the adjusting movement from the auxiliary motor 43, 44 to the propeller blades are omitted since it may be similar to that shown in Fig. 2. The device of Fig. 3 differs from that shown in Fig. 2 mainly by the slide valve 71 controlling the supply and exhaust of the driving medium to and from the auxiliary motor 43, 44 mounted on the propeller, and instead of being arranged upon a revolving part of the propeller, is mounted on a casing 72 secured to the craft, this casing being connected with the pump 53 by means of pipes 54, 55, and with the auxiliary motor 43, 44 by means of pipes 63, 64. The slide valve is connected by a rod 73 to one end 74 of a double-armed lever 75, the other end 76 of which is connected by a positively active gear, which comprises the spur wheels 78, 79, rack 80 and rod 81, of the auxiliary motor, so that to a certain adjustment of the auxiliary motor also corresponds a predetermined adjustment of the point 76. The pivot 83 of lever 75 is connected by means of rod 84 to the pivot 85 of another double-armed lever 86. One end 87 of this lever is connected with the sleeve collar 88 of a centrifugal governor 89, the other end 90 with a hand lever 91, which is held in position by a ratchet 92. With the sleeve collar 88 of the centrifugal governor another lever 86' controlling a similar device is connected and joined with another screw propeller.

When the propeller and its engine operate at the desired speed, the slide valve 71 occupies its middle position, in which the conduits 63, 64 leading to the auxiliary motor 43, 44 are closed, the auxiliary motor being at rest. Whenever a change of speed occurs, the governor 89 will shift the slide valve 71 a certain distance, the auxiliary motor 43, 44 will be started and will adjust the propeller blades. This shifts adjustment rod 81 and slide valve 71 is returned into its initial position by the lever 75. Consequently the displacement of the slide valve 71 and the adjustment of the propeller blades are positively dependent upon each other. Every position of the rod 84, which corresponds to rod 23 of Fig. 1, is correlated, to a predetermined adjustment of the propeller blades.

In the device shown in Fig. 4, propeller blades 41 and 42, rotatably mounted in the hub 21, are adjusted by means of an hydraulic piston 95 which is arranged in bore 96 of hub 21 for displacement in the direction of the propeller shaft axis. The piston movement is transmitted by a piston rod 97 onto a cross beam 98 having racks 101, 102 fixed to its ends. Each rack meshes with a gear 103, 104 fixed to the blade 41, 42, respectively. An end of rod 107 is tightly fitted within central cavity 106 of the piston 95, rod 107 being arranged for axial displacement and angular movement relative to the piston. This rod extends through the hollow propeller shaft 3, its projecting end being formed with an eye 108 serving to connect it to the adjusting device. The rod 107 serves for controlling the movement of the piston 95 and also for the supply and exhaust of the fluid driving medium. To this end it is subdivided by a partition 109 into two conduits, an intake conduit 111 and an exhaust conduit 112, each of which is connected by means of a flexible pipe 113 and 114, respectively, to the source of driving medium, for example a pressure pump. The outer walls of the conduits 111, 112 have perforations 115, 116 (on the intake side) and 117 (on the exhaust side) in the portion of rod 107 within piston 95, these perforations communicating with annular grooves 118, 119 and 120, respectively, formed in the rod 107. Said annular grooves coact with conduits 121 and 122, respectively, formed in the piston body and communicating with the cavity 106. The conduits 121 communicate with the space 125 on one side, the conduits 122 with the space 126 on the other side of the piston 95.

In the middle position of the rod 107 shown in the drawings all conduits are closed and the piston 95 is at rest. Upon rod 107 being shifted in one direction, for example forwards, the intake conduit 111 is connected with the space 126 through the perforation 116, annular groove 119 and conduits 122. The conduit 112 is connected with space 125 through perforation 117, annular groove 120 and conduits 121. The pressure above normal hereby generated in the space 126 now also drives the piston 95 forwards and thereby causes the propeller blades to be adjusted. This adjusting operation continues until the inner ends of the piston conduits are covered again; the piston exactly follows the adjusting movements of the rod 107 (following adjustment). This rod 107 thus again corresponds, as far as its action is concerned, to the rod 17 or 18 in Fig. 1; any adjustment of the rod results in an adjustment of the blades of exactly predetermined magnitude.

Instead of the hydraulic auxiliary force used in the devices illustrated in Figs. 2 to 4, other auxiliary forces (for instance pneumatic, mechanical or electrical forces) may be used to adjust the blades. These forces must be subjected in principle to the same control as the hydraulic force, according to the examples above described.

Fig. 5 illustrates the system of rods serving to adjust the blades for a certain position of propulsion. This system resembles that shown in Fig. 1 and similar parts are therefore marked with similar reference numerals. Also the mode of action is substantially the same as in Fig. 1.

The blades of the screw propellers 1 and 2 are at first adjustable as in Fig. 1 in response to a common speed-responsive member, for example a centrifugal governor 31. The sleeve 130 of this governor is connected to the system of adjusting rods not directly, but by means of an auxiliary source of power 131, which may have the form of an hydraulic piston controlled by a following control (similar to that shown in Fig. 4) in such manner that it exactly follows the displacements of a rod 132 connected to the sleeve 130, and the displacements of which are further transmitted onto the system of rods by means of the piston rod 133. The spring 135 of the governor, which acts counter to the centrifugal force, may be placed under greater or less tension by means of a lever 137, one end of which abuts against the displaceable spring abutment 136, while its other end is connected to a screw spindle 138. In this manner the number of rotations, which shall be kept constant by the governor 31, may be chosen as desired. Similarly as in Fig. 1 the centrifugal governor acts on the ends 27 and 28 of the double-armed levers 25, 26, the pivots of which are connected to the rods 23, 24, respectively. The other ends 33, 34 of the levers are connected by means of rods 141, 142 to the ends of a double-armed rudder lever 144 pivotally mounted at 145, which is used to adjust the rudder of an aircraft or of a ship. If the rudder is adjusted by rocking lever 144, levers 25, 26 are adjusted in the opposite sense. In correspondence therewith the blades of the propeller screws 1, 2 are adjusted in addition to the adjustment imparted to them by the governor 31, the blades of one propeller being adjusted to a higher, those of the other propeller to a lower pitch. The connection of the system of adjusting rods to the rudder lever is effected in such manner that the outer propeller in the turn is imparted an increase, the inner propeller in the turn a reduction of its pitch.

Various changes may be made in the details disclosed in the foregoing specification without departing from the invention or sacrificing the advantages thereof.

I claim:

1. In an aircraft having a plurality of propellers driven by a single engine and each propeller having a hollow drive shaft with a hydraulic pitch adjusting mechanism incorporated therein, a control system for simultaneously adjusting the pitch of said propellers comprising a hydraulic valve mounted within each hollow shaft adjacent the adjusting mechanism for its propeller, individual rods, one of said rods being joined to each valve, said rods being slidable in the shafts, a control device common to all of said propellers, and mechanical linkage means joining said device to each of said rods.

2. In an aircraft as in claim 1, said control device being operatively connected to said engine.

3. In an aircraft having a plurality of propellers driven by a single engine and each propeller having a hollow drive shaft with a hydraulic pitch adjusting mechanism incorporated therein, a control system for simultaneously adjusting the pitch of said propellers comprising a hydraulic valve mounted within each hollow shaft adjacent the adjusting mechanism for its propeller, individual rods, one of said rods being joined to each valve, said rods being slidable in the shafts, and mechanical linkage means for transmitting control impulses from said engine to each of said rods for operating said mechanisms.

4. In an aircraft as in claim 1, said system including manually operable means for separately and independently actuating said rods.

5. In an aircraft as in claim 1, said system including a control surface actuating mechanism, and means joining said actuating mechanism to said rods for oppositely changing the pitch of the propeller blades located on opposite sides of the longitudinal axis of the aircraft upon turning of the aircraft in its direction of flight.

OTTO MADER.